United States Patent Office 2,938,007
Patented May 24, 1960

2,938,007

COMPOSITIONS COMPRISING AN ORGANOPOLY-SILOXANE, SILICA AND A DICARBOXYLIC ACID ESTER PLASTICIZER AND THE HEAT CURED PRODUCT THEREOF

Richard M. Savage, Loudonville, N.Y., assignor to General Electric Company, a corporation of New York No Drawing. Filed June 17, 1957, Ser. No. 666,253

23 Claims. (Cl. 260—31.8)

This invention is concerned with improved organopolysiloxanes convertible to the cured, solid, elastic state. More particularly, the invention relates to a composition of matter comprising (1) an organopolysiloxane convertible to the cured, solid, elastic state, (2) a finely divided inorganic filler, and (3) a dialcohol ester of a dicarboxylic acid selected from the class consisting of aromatic dicarboxylic acids and aliphatic dicarboxylic acids containing at least six carbon atoms in the aliphatic chain (including the carbon atoms of the carboxy groups), the alcohol residue of said ester containing at least 4 carbon atoms. The invention also includes cured products obtained from the aforesaid compositions of matter.

Cured or solid, elastic organopolysiloxanes (also known as "silicone rubbers"), although having good heat resistance and being capable of being readily flexed at low temperatures, have undesirably low tear strengths. Moreover, under usual conditions, the tensile strengths or elongations of such cured products are quite a bit lower than the same properties of other synthetic rubbers of the hydrocarbon type or of the copolymeric type exemplified by copolymers of butadiene and styrene, butadiene and acrylonitrile, isoprene polymers, natural rubber, etc. In addition, cured silicone rubber has been found to be somewhat stiff in certain applications, particularly when employed on making nursing nipples as is more particularly disclosed and claimed in the copending application of Howlett and Baldock, Serial No. 405,712, filed January 25, 1954, and assigned to the same assignee as the present invention.

It has also been found that certain finely divided silica fillers (many examples of which are described in Warrick Patent 2,541,137) impart to the organopolysiloxane convertible to the cured, solid, elastic state, undesirable characteristics when stored for any length of time. Thus, these finely divided fillers make the convertible organopolysiloxane tough and nervy; this toughness and nerve of the filled, curable organopolysiloxane is known as "structure" and is recognized by the presence of an undesirable snap and difficulty in rendering plastic the rubber compound by usual mechanical working. After incorporation of these structure-inducing fillers in the convertible organopolysiloxane, it will be found that after the filled compound is stored for any length of time, for instance, from about two days to several months, this toughness and nerve increase to such a point that excessive milling times are required to form a plastic continuous film around the faster roll of a two-roll differential mill (whose rolls are operating at different speeds) normally used for rendering the stored compound plastic prior to further processing of the latter, such as for purposes of incorporating other fillers and additives, for instance, curing agents, compression set additives, etc., or for freshing the filled compound so as to give better flow in subsequent molding, calendering, or extrusion operations. A more complete description of this phenomenon is found in the now abandoned copending application of Savage and Wormuth, Serial No. 399,148, filed December 18, 1953, and assigned to the same assignee as the present invention. By reference, this application is made part of the disclosures of the present application.

It is therefore one of the objects of this invention to increase the tensile strength of cured, solid, elastic organopolysiloxanes.

It is another object of the invention to increase the elongation characteristics of cured, solid, elastic organopolysiloxanes.

It is a still further object of the invention to improve the tear strength of cured silicone rubber compositions.

A still further object of the invention is to improve the knit time, that is, to reduce the time required to cause ready fusing of the laps and folds of a vulcanizable silicone rubber stock to form a continuous, homogeneous, textured sheet during milling.

Another object of the invention is to increase the amounts of fillers of lower cost which can be incorporated in convertible organopolysiloxanes, and still retain satisfactory elongation in the cured organopolysiloxane products.

Other objects of this invention will become apparent from the discussion which follows.

In accordance with my invention, I am able to attain the aforesaid objectives by incorporating in a filled organopolysiloxane convertible to the cured, solid, elastic state, minor amounts of a dialcohol ester of a polycarboxylic acid selected from the class consisting of aromatic dicarboxylic acids and aliphatic dicarboxylic acids, the aliphatic acids containing at least 6 carbon atoms in the aliphatic chain (including the carboxylic acid groups), and the alcohol residue of the said ester containing at least four carbon atoms.

In the specification and in the claims, for brevity, the convertible organopolysiloxanes, which may be viscous masses or gummy solids (depending on the state of condensation of the starting organopolysiloxane, polymerizing agent, etc.), will hereinafter be referred to as "convertible organopolysiloxanes" or, more specifically, as "convertible methylpolysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950; all the foregoing patents being assigned to the same assignee as the present invention; Hyde Patent 2,490,357, issued December 5, 1949; and Warrick Patent 2,541,137, issued February 13, 1951.

It will, of course, be understood by those skilled in the art that other convertible organopolysiloxanes containing the same or different silicon-bonded organic substituents (e.g., methyl, ethyl, propyl, vinyl, allyl, phenyl, tolyl, xylyl, benzyl, phenylethyl, naphthyl, chlorphenyl, both methyl and phenyl, etc., radicals) connected to the silicon atoms by carbon-silicon linkages, may be employed in the present invention without departing from the scope of this invention. The particular convertible organopolysiloxane used is not critical and may be any one of those described in the foregoing patents generally obtained by condensation of a liquid organopolysiloxane containing an average of from about 1.95, preferably from about 1.98 to about 2.05 organic groups per silicon atom. The condensing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which may contain, if desired, for example, up to 2 mol percent copolymerized monoorganosiloxane, for example, copolymerized monomethylsiloxane. Generally, I prefer to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents composed essentially of monovalent organic radicals attached to silicon by carbon-silicon linkages, and in which essentially all the siloxane units consist of units of the structural formula $R_2SiO$ where R is preferably a radical of the group consisting of methyl and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e.g., from 1 to 20 or more mol percent) of any of the following units, alone or in combination therewith: $C_6H_5(CH_3)SiO$ and $(C_6H_5)_2SiO$. The presence of halogen, e.g., chlorine, atoms on the phenyl nucleus is not precluded. Also, the organopolysiloxane may contain up to 4 or more mol percent, preferably from 0.01 to 2 mol percent, silicon-bonded vinyl or allyl groups.

The finely divided fillers which have caused the above-described structure build-up and undesirable length of time for knitting of the convertible organopolysiloxane are usually finely divided silica fillers, some of which are free of hydroxyl groups either in the form of adsorbed moisture or silicon-bonded hydroxyl groups, depending on the method by which they are prepared. Under some conditions of manufacture, silica fillers which contain hydroxyl groups bonded directly to silicon of the silica molecule, or silica fillers containing silicon-bonded alkoxy group also increase the structure and knit times when these types of silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such structure-causing silica fillers may be found described in U.S. Patents 2,541,137; 2,610,167 and 2,657,149. Such structure-causing fillers may be slightly acidic or alkaline depending upon the method of manufacture, and may be obtained through an aerosol-aerogel process, by fuming processes such as by the vapor phase burning of silicon tetrachloride or ethyl silicate, etc.

Another finely divided reinforcing filler which has been employed with convertible organopolysiloxanes but which also imparts undesirable structure to the convertible organopolysiloxane is a finely divided gamma alumina of average particle size less than 100 millimicrons. Such a filler and its use in combination with convertible organopolysiloxanes are more particularly described and claimed in Savage Patent 2,671,069, issued March 2, 1954, and assigned to the same assignee as the present invention.

Included among the dialkyl esters of dicarboxylic acids of the type described above (hereinafter referred to as "ester") may be mentioned those in which the alcohol residue is obtained from alcohols containing at least 4 carbon atoms. Included among such alcohols are, for instance, butanol, isobutanol, tertiary butanol, the various isomeric pentanols, hexanols (e.g., 2-ethylbutanol), octanols (e.g., 2-ethylhexanol), nonyl alcohols, decyl alcohols, dodecyl alcohols, etc. Generally, the alcohol advantageously contains from 4 to 12 carbon atoms in the aliphatic chain. The aliphatic alcohol may be a straight chain or may be branch-chained and may contain primary, secondary or tertiary carbon-bonded hydroxyl groups.

Among the aromatic dicarboxylic acids which may be employed in making the esters are, for instance, phthalic acid, phthalic anhydride, isophthalic acid, terephthalic acid, benzophenone-2-4'-dicarboxylic acid, nuclearly halogenated aromatic dicarboxylic acids, for instance, the mono to tetrachlorophthalic acids, etc. Anhydrides of such acids may be employed if available, and the term "dicarboxylic acid" is intended to include anhydrides thereof.

Among the aliphatic dicarboxylic acids which may be used are, for instance, adipic, pimelic, suberic, azelaic, sebacic acids, etc. These acids are saturated dibasic acids and may be considered as having the general formula $C_nH_{2n-2}O_4$ where n is a whole number equal to at least 6 and ranging, for instance, from 6 to 12 or more.

Included among the esters which may be employed in the practice of the present invention are, for instance, dibutyl phthalate, dibutyl isophthalate, di-(n-hexyl) azelate, di-(2-ethylbutyl) adipate, di-(n-hexyl) phthalate, dibutyl adipate, di-(2-ethylhexyl) phthalate, di-(2-ethylhexyl) azelate, dinonyl sebacate, dibenzyl sebacate, di-(2-ethylbutyl) phthalate, dicyclohexyl phthalate, dioctyl tetrachlorophthalate, etc.

Although the amount of ester used may be varied, generally for optimum results, keeping in mind the desirability of maintaining the heat resistant and flexibility characteristics at low temperatures of the cured, solid, elastic products, I may use from about 1 to 20 parts of the ester per 100 parts of the convertible organopolysiloxane. Some applications, for instance, in applications involving the use of the disclosed and claimed compositions for making nursing nipples, it is desirable, on a weight basis, that the amount of the ester range from about 2 to 8 parts per 100 parts of the convertible organopolysiloxane.

In order to convert the organopolysiloxane to the cured state, it is desirable to incorporate small amounts of peroxide curing agents, for instance, benzoyl peroxide, tertiary butyl perbenzoate, ditertiary butyl peroxide, bis-(2,4-dichlorobenzoyl) peroxide, etc. Such peroxides are advantageously employed in amounts ranging from about 0.5 to about 4 to 6 percent or more, by weight, based on the weight of the convertible organopolysiloxane.

After forming the mixture of ingredients comprising the convertible organopolysiloxane, the finely divided silica filler, the curing agent, and the above-described ester, the mixture of ingredients is preferably molded at temperatures of from about 125° to 200° C. for times varying from about 5 to 30 minutes or more at pressures ranging from about 250 to 2000 p.s.i.or more, and thereafter heat-treated at elevated temperatures, for instance, at 150° to 300° C. for times ranging from about 1 hour to 24 hours or more to obtain the optimum cure and properties of the final product.

In order that those skilled in the art may better understand how the present invention may be practiced, the following examples are given by way of illustration and not by way of limitation. All the ingredients listed in the following examples are employed in parts by weight. The term "hexyl" in the following examples denotes the 2-ethylbutyl group.

In the following examples, three convertible organopolysiloxanes were employed. One organopolysiloxane was obtained by copolymerizing octamethylcyclotetrasiloxane with tetramethyltetravinylcyclotetrasiloxane with a small amount of potassum hydroxide, the silicon-bonded vinyl groups comprising from about 0.1 to 0.2 mol percent of the total number of methyl and vinyl groups in both cyclotetrasiloxanes. The copolymerization temperature was of the order of about 140° to 150° C. for about 5 hours. The convertible methyl vinylpolysiloxane thus obtained was heated at elevated temperatures of about 200° to 250° C. to remove any volatile material boiling within this range. This convertible methyl vinylpolysiloxane will hereinafter be referred to as "Silicone gum 1."

A second convertible organopolysiloxane was prepared identically as was done with Silicone gum 1 with the exception that no volatile materials were removed. This non-devolatilized silicone gum was identified as "Silicone gum 2."

A methyl phenylpolysiloxane convertible to the cured, solid, elastic state was prepared by copolymerizing octamethylcyclotetrasiloxane with octaphenylcyclotetrasiloxane with a small amount of potassium hydroxide at a temperature of from 140° to 150° C. in such proportion that there was present in the copolymerized product about 8 mol percent silicon-bonded phenyl groups. This methyl phenylpolysiloxane convertible to the cured, solid, elastic state was devolatilized at about 200° to 250° C. to remove volatiles boiling in this range; this gum will hereinafter be referred to as "Silicone gum 3."

EXAMPLE 1

In this example, various formulations were prepared in which the ingredients used are recited in the following Table I employing Silicone gum 1 as the convertible organopolysiloxane.

Table I

| Ingredient | Sample Numbers [1] | | | | |
|---|---|---|---|---|---|
| | 1 | 2 | 3 | 4 | 5 |
| Silicone gum 1 | 100 | 100 | 100 | 100 | 100 |
| Fume silica | 40 | 40 | 40 | 40 | 40 |
| Bis-(2,4-dichlorobenzoyl) peroxide [2] | 0.84 | 0.84 | 0.84 | 0.84 | 0.84 |
| Di-(2-ethylhexyl) phthalate | 0 | 2 | 4 | 8 | 16 |

[1] Ingredients are all in parts by weight.
[2] In the form of a 40 percent weight methylpolysiloxane fluid dispersion.

Each of the formulations described in Table I was pressed for 10 minutes at about 140° C. at a pressure of about 500 p.s.i., removed from the mold, and thereafter heated in an air-circulating oven for one hour at 150° C. The following Table II shows the properties of the various formulations after this molding and heating cycle.

Table II

| | Sample Numbers | | | | |
|---|---|---|---|---|---|
| | 1 | 2 | 3 | 4 | 5 |
| Tensile strength, p.s.i. | 813 | 1,260 | 1,366 | 1,471 | 1,521 |
| Percent elongation | 190 | 330 | 390 | 525 | 675 |
| Tear strength, lbs./inch | 43 | 65 | 86 | 125 | 182 |

EXAMPLE 2

In this example formulations were prepared from Silicone gum 2 and two diesters, specifically di-(2-ethylhexyl) phthalate and dihexyl azelate. In each instance the samples were molded and thereafter heated similarly as was done with the samples described in Example 1. The following Table III shows the ingredients employed in making the formulation while Table IV shows the properties of the molded and heat treated samples. In Table III, the bis-(2,4-dichlorobenzoyl) peroxide was again employed in the form of a 40 percent weight dispersion in a methylpolysiloxane fluid. The ingredients listed in Table III are all in parts, by weight.

Table III

| Ingredient | Sample Numbers | | | | | |
|---|---|---|---|---|---|---|
| | 6 | 7 | 8 | 9 | 10 | 11 |
| Silicone gum 2 | 100 | 100 | 100 | 100 | 100 | 100 |
| Fume silica | 40 | 40 | 40 | 40 | 40 | 40 |
| Bis-(2,4-dichlorobenzoyl) peroxide | 0.84 | 0.84 | 0.84 | 0.84 | 0.84 | 0.84 |
| Di-(2-ethylhexyl) phthalate | 16 | | | | | |
| Dihexyl azelate | | | 2 | 4 | 8 | 16 |

Table IV

| | Sample Numbers | | | | | |
|---|---|---|---|---|---|---|
| | 6 | 7 | 8 | 9 | 10 | 11 |
| Tensile strength, p.s.i. | 1,495 | 1,270 | 1,325 | 1,500 | 1,515 | 1,395 |
| Percent elongation | 780 | 295 | 350 | 465 | 520 | 715 |
| Tear strength, lbs./inch | 217 | 79 | 122 | 134 | 158 | 204 |

EXAMPLE 3

In this example, Silicone gum 3 was mixed with a finely divided silica filler containing silicon-bonded alkoxy groups manufactured in accordance with the process described in Iler Patent 2,657,149. The following Table V shows the ingredients used to make the various formulations. The benzoyl peroxide described in Table V was employed in the form of a 50 percent weight dispersion in a methylpolysiloxane fluid. Each of the formulations was molded similarly as was done in Example 1, and thereafter heat-treated outside the mold for 24 hours at 150° C. The following Table VI shows the properties of the molded samples as the result of this heat treatment. The ingredients listed in Table V are all in parts, by weight.

Table V

| Ingredient | Sample Numbers | | | |
|---|---|---|---|---|
| | 12 | 13 | 14 | 15 |
| Silicone gum 3 | 100 | 100 | 100 | 100 |
| Valron Estersil [1] (finely divided silica) | 50 | 50 | 50 | 50 |
| Benzoyl peroxide | 1.75 | 1.75 | 1.75 | 1.75 |
| Di-(2-ethylhexyl) phthalate | | 2 | 4 | 8 |

[1] Esterified silica manufactured pursuant to the aforesaid Iler patent by E. I. du Pont de Nemours & Co.

Table VI

| | Sample Numbers | | | |
|---|---|---|---|---|
| | 12 | 13 | 14 | 15 |
| Tensile strength, p.s.i. | 1,095 | 1,180 | 1,180 | 1,295 |
| Percent elongation | 410 | 475 | 550 | 620 |
| Tear strength, lbs./inch | 187 | 194 | 203 | 186 |

The knit times of samples 12 to 15 were also determined as follows. The knit time test was conducted as follows: a two-roll differential laboratory mill, 3" x 8", was employed in which the speed ratio was 1.4 to 1 and the faster roll revolved at a speed of about 60 revolutions per minute. The mill roll clearance was adjusted to pass a 12-mil thick soft solder slug at a temperature of around 21° to 32° C. In conducting the test for knit time, 30 grams of the compound under test were added to the nip of the roll in small pieces to permit passage therethrough. A preliminary pass often was required at a somewhat slightly wider setting to reduce the sample thickness. When all of the compound had passed through the nip once, a stop watch was triggered and the timing begun. The compound was added to the nip again and in order to keep the "bank" of compound in motion, it was sometimes necessary to open the mill slightly for a brief interval and then return to the predetermined 12-mil adjustment. The timing was continued until the compound became plastic and completely covered the width of the faster roll in the form of a continuous solid film. As soon as this happened, the timing was stopped and this elapsed time was recorded as "knit time."

Table VII shows the knit time in seconds for each of these formulations, it being evident from Table VII that the incorporation of the esters greatly reduces the knit time and thus imparts an important advantage to the use of the esters with the filled organopolysiloxane.

*Table VII*

| Time of Storage Before Test | Sample Numbers | | | |
|---|---|---|---|---|
| | 12 | 13 | 14 | 15 |
| | Knit Time in Seconds | | | |
| 1 day | 29 | 17 | 11 | 10 |
| 7 days | 73 | 50 | 30 | 19 |
| 14 days | 109 | 68 | 49 | 29 |
| 28 days | 283 | 183 | 130 | 93 |

EXAMPLE 4

In this example, Silicone gum 2 was mixed with finely divided fume silica and a small amount of bis-(2,4-dichlorobenzoyl) peroxide (in the form of a 40 percent weight dispersion with a methylpolysiloxane fluid), and to this mixture were added varying amounts of three esters, namely, dihexyl azelate, dibutyl phthalate, and dihexyl phthalate. In some mixtures, there was also incorporated diphenylsilanediol (intermixed for convenience with an equal part of a convertible methylpolysiloxane gum), the said diphenylsilanediol being added for the purpose of reducing the structure of the curable mixture of ingredients as is described in the above-described Savage and Wormuth application. The following Table VIII shows the various ingredients used for the different formulations which were molded similarly as in Example 1 and thereafter heat-treated for 1 hour at 150° C. or for 24 hours at 250° C. as indicated. Table IX shows the physical properties of the samples after the one-hour heat treatment at 150° C. and after 24 hours at 250° C.

*Table VIII*

| Ingredient | Sample Numbers | | | | | | | | |
|---|---|---|---|---|---|---|---|---|---|
| | 16 | 17 | 18 | 19 | 20 | 21 | 22 | 23 | 24 |
| Silicone gum 2 | 100 | 100 | 100 | 100 | 100 | 100 | 100 | 100 | 100 |
| Fume silica | 40 | 40 | 40 | 40 | 40 | 40 | 40 | 40 | 40 |
| Diphenylsilanediol | | 2 | 4 | | 2 | | 2 | | 2 |
| Bis(2,4-dichlorobenzoyl) peroxide | 0.84 | 0.84 | 0.84 | 0.84 | 0.84 | 0.84 | 0.84 | 0.84 | 0.84 |
| Dihexyl azelate | 4 | 4 | 4 | 6 | 8 | | | | |
| Dibutyl phthalate | | | | | | 4 | 4 | | |
| Dihexyl phthalate | | | | | | | | 4 | 4 |

*Table IX*

| | Sample Numbers | | | | | | | | |
|---|---|---|---|---|---|---|---|---|---|
| | 16 | 17 | 18 | 19 | 20 | 21 | 22 | 23 | 24 |
| 1 hour/150° C.: | | | | | | | | | |
| Tensile strength, p.s.i | 1,580 | 1,425 | 1,520 | 1,500 | 1,640 | 1,590 | 1,455 | 1,535 | 1,595 |
| Percent elongation | 490 | 560 | 710 | 640 | 760 | 450 | 530 | 435 | 520 |
| Tear strength | 134 | 122 | 133 | 152 | 171 | 108 | 110 | 113 | 95 |
| 24 hours/250° C.: | | | | | | | | | |
| Tensile, p.s.i | 746 | 725 | 745 | 674 | 590 | 766 | 753 | 775 | 688 |
| Percent elongation | 210 | 250 | 375 | 240 | 215 | 250 | 310 | 290 | 285 |
| Tear strength | 82 | 77 | 79 | 74 | 62 | 80 | 81 | 83 | 73 |
| Percent compression set (22 hours/177° C. according to ASTM D-395-55, method B) | 34 | 37 | 35 | 37 | 41 | 45 | 27 | 33 | 33 |

EXAMPLE 5

In this example, Silicone gum 3 was mixed with finely divided silica, namely, Valron estersil which is more particularly described in the above-mentioned Iler patent, and to this mixture of ingredients were added diphenylsilanediol (an additive for reducing the knit time of silicone rubber compound), and benzoyl peroxide (in the form of 50 percent weight dispersion in a methylpolysiloxane fluid). Molding formulations were prepared from this mixture of ingredients, both with and without di-(2-ethylhexyl) phthalate. Some formulations were prepared in which the diphenylsilanediol was omitted, but still incorporating the di-(2-ethylhexyl) phthalate. The following Table X shows the various formulations employed and Table XI shows the properties of the molded samples after molding for 10 minutes at 140° C. and heat-aging for 1 hour at 150° C. The properties of molded samples were also determined after they were heated for 24 hours at 150° C. in an air-circulating oven. The ingredients in Table X are listed as parts, by weight. The knit times of the molding compositions containing the structure-inducing filler, Valron estersil, are found in Table XII.

*Table X*

| Ingredient | Sample Numbers | | | | |
|---|---|---|---|---|---|
| | 25 | 26 | 27 | 28 | 29 |
| Silicone gum 3 | 100 | 100 | 100 | 100 | 100 |
| Valron Estersil | 50 | 50 | 50 | 50 | 50 |
| Diphenylsilanediol | 0.5 | 0.5 | 0.5 | | |
| Benzoyl peroxide | 1.75 | 1.75 | 1.75 | 1.75 | 1.75 |
| Di-(2-ethylhexyl) phthalate | | 2 | 4 | 2 | 4 |

Table XI

| | Sample Numbers | | | | |
|---|---|---|---|---|---|
| | 25 | 26 | 27 | 28 | 29 |
| 1 hour/150° C.: | | | | | |
| Tensile strength, p.s.i | 1,000 | 1,100 | 1,235 | 985 | 1,110 |
| Percent elongation | 550 | 690 | 810 | 600 | 690 |
| Tear strength, lbs./inch | 151 | 160 | 188 | 190 | 128 |
| 24 hours/150° C.: | | | | | |
| Tensile strength, p.s.i | 850 | 995 | 1,295 | 985 | 1,085 |
| Percent elongation | 335 | 445 | 580 | 440 | 495 |
| Tear strength, p.s.i | 152 | 160 | 168 | 161 | 154 |

Table XII

| | Sample Numbers | | | | |
|---|---|---|---|---|---|
| Time of Storage Before Test | 25 | 26 | 27 | 28 | 29 |
| | Knit Time in Seconds | | | | |
| 4 days | 49 | 35 | 25 | 36 | 21 |
| 7 days | 50 | 34 | 23 | 35 | 26 |
| 15 days | 72 | 60 | 37 | 37 | 30 |
| 28 days | 75 | 58 | 46 | 47 | 47 |

One of the advantages obtainable by the use of the aforesaid esters is the ability to incorporate larger amounts of fillers in the convertible organopolysiloxane without sacrifice of elongation of the cured rubber. Thus, for instance, employing a formulation composed of 100 parts of a convertible methylpolysiloxane, 40 parts of a finely divided silica, for instance, fume silica, and the usual amount of a peroxy curing agent, such a cured material can be expected to have an elongation of about 120 percent when heat-treated at about 250° C. for 24 hours. However, for instance, when 60 parts of additional silica filler are incorporated, the elongation usually drops to about 30 to 40 percent. The incorporation of small amounts of the aforesaid esters, for instance, dibutyl phthalate or di-(2-ethylhexyl) phthalate, in amounts ranging from about 2 to 4 percent, by weight, based on the weight of the convertible organopolysiloxane, raises the percent elongation back to around 120 percent, while at the same time materially enhancing the tensile strength, even after heat treatment at elevated temperatures for extended periods of time.

It will, of course, be apparent to those skilled in the art that other esters may be employed in place of those used in the foregoing examples without departing from the scope of the invention. In addition, the amount of ester used may be varied but preferably is within the range of from about 1 to 20 percent, by weight, based on the weight of the convertible organopolysiloxane.

Other convertible organopolysiloxanes, for instance, convertible ethylpolysiloxanes, as well as other curing agents, may be employed in place of the convertible organopolysiloxanes and curing agents described in the foregoing examples. The proportion of ingredients may be varied widely as may the other conditions recited above without departing from the scope of the invention. The application involved, the organopolysiloxane used, the filler employed, the additive incorporated, etc., will all contribute to the relationship between the ingredients used as well as the proportions of ingredients employed. Obviously, other fillers which do not induce structure and which do not undesirably affect knit time, such as, for instance, titanium dioxide, lithopone, zinc oxide, zirconium silicate, ferric oxide, calcium carbonate, etc., may be incorporated in the convertible organopolysiloxane, either alone or in combination with the structure-inducing fillers.

The amount of filler used in combination with the convertible organopolysiloxane may obviously be varied within wide limits, for instance, from about 10 to 300 percent, by weight, of the filler based on the weight of the convertible organopolysiloxane. The exact amount of filler used will depend upon such factors as, for instance, the application for which the convertible organopolysiloxane is intended, the type of filler employed (e.g., density of the filler), the type of convertible organopolysiloxane employed, the type of ester used, etc. Structure difficulty and excessive knit times are particularly troublesome when the above-described finely divided silica fillers comprise, by weight, from 0.2 to 0.6 part filler per part convertible organopolysiloxane.

The compositions herein described, particularly those having reduced structure and lower knit times, can be advantageously employed in extrusion, molding, and calendering applications. Glass cloth can be coated with the convertible organopolysiloxanes herein described containing filler, curing agent, and the particular diester additive, and thereafter the coated glass cloth can be wrapped around mandrels to make heater ducts and cured under heat and pressure to give unitary structures having outstanding heat resistance. Compounds prepared in the above manner can be readily extruded over electrical conductors and can be heat-treated at elevated temperatures in order to obtain a smooth, coherent, cured insulation having good thermal stability.

What I claim as new and desire to secure by Letters Patent of the United States is:

1. A composition of matter comprising (1) an organopolysiloxane convertible to the cured, solid, elastic state in which the organic groups are attached to silicon by carbon-silicon linkages and are selected from the class consisting of monovalent hydrocarbon radicals and halogenated aryl radicals, there being present an average of from 1.98 to 2.05 organic groups per silicon atom, (2) a finely divided silica filler, and (3) a diester of a dicarboxylic acid selected from the class consisting of aromatic dicarboxylic acids and aliphatic dicarboxylic acids containing from six to twelve carbon atoms in the chain and a monohydric alcohol containing from four to twelve carbon atoms.

2. A composition of matter as in claim 1 containing an organic peroxide curing agent for (1).

3. A composition of matter comprising (1) a methylpolysiloxane convertible to the cured, solid, elastic state in which the methyl groups are attached to silicon by carbon-silicon linkages, there being present from 1.98 to 2.05 methyl groups per silicon atom, (2) a finely divided silica filler and (3) di-(2-ethylhexyl) phthalate.

4. A composition of matter comprising (1) a methylpolysiloxane convertible to the cured, solid, elastic state in which the methyl groups are attached to silicon by carbon-silicon linkages, there being present from 1.98 to 2.05 methyl groups per silicon atom, (2) a finely divided silica filler and (3) dihexyl azelate.

5. A composition of matter comprising (1) a methylpolysiloxane convertible to the cured, solid, elastic state in which the methyl groups are attached to silicon by carbon-silicon linkages, there being present from 1.98 to 2.05 methyl groups per silicon atom, (2) a finely divided silica filler and (3) dihexyl phthalate.

6. A composition of matter comprising (1) a methylpolysiloxane convertible to the cured, solid, elastic state in which the methyl groups are attached to silicon by carbon-silicon linkages, there being present from 1.98 to 2.05 methyl groups per silicon atom, (2) a finely divided silica filler and (3) dibutyl phthalate.

7. A composition of matter comprising (1) a methyl phenylpolysiloxane convertible to the cured, solid, elastic state in which the methyl and phenyl groups are attached to silicon by carbon-silicon linkages, there being present from 1.98 to 2.05 total methyl and phenyl groups per silicon atom, (2) a finely divided silica filler and (3) di-(2-ethylhexyl) phthalate.

8. The heat-cured product of claim 1 in which the curing is carried out in the presence of an organic peroxide curing agent.

9. The heat-cured product of claim 3 in which the curing is carried out in the presence of an organic peroxide curing agent.

10. The heat-cured product of claim 4 in which the curing is carried out in the presence of an organic peroxide curing agent.

11. The heat-cured product of claim 5 in which the curing is carried out in the presence of an organic peroxide curing agent.

12. The heat-cured product of claim 6 in which the curing is carried out in the presence of an organic peroxide curing agent.

13. The heat-cured product of claim 7 in which the curing is carried out in the presence of an organic peroxide curing agent.

14. A composition of matter comprising (1) a methyl vinylpolysiloxane convertible to the cured, solid, elastic state in which the methyl and vinyl groups are attached to silicon by carbon-silicon linkages, there being present from 1.98 to 2.05 total methyl and vinyl groups per silicon atom, (2) a finely divided silica filler, (3) a diester of a dicarboxylic acid selected from the class consisting of aromatic dicarboxylic acids and aliphatic dicarboxylic acids containing from six to twelve carbon atoms in the chain, and a monohydric alcohol containing from four to twelve carbon atoms, and (4) an organic peroxide curing agent for (1).

15. The heat-cured product of claim 14.

16. A composition of matter comprising (1) a methylpolysiloxane convertible to the cured, solid, elastic state in which the methyl groups are attached to silicon by carbon-silicon linkages, there being present from 1.98 to 2.05 methyl groups per silicon atom, (2) a finely divided silica filler, (3) a diester of a dicarboxylic acid selected from the class consisting of aromatic dicarboxylic acids and aliphatic dicarboxylic acids containing from six to twelve carbon atoms in the chain and a monohydric alcohol containing from four to twelve carbon atoms and (4) an organic peroxide curing agent for (1).

17. A composition of matter comprising (1) a vinyl methylpolysiloxane convertible to the cured, solid, elastic state in which the vinyl and methyl groups are attached to silicon by carbon-silicon linkages, there being present from 1.98 to 2.05 total methyl and vinyl groups per silicon atom, (2) a finely divided silica filler, (3) di-(2-ethylhexy) phthalate, and (4) an organic peroxide curing agent for (1).

18. A composition of matter comprising (1) a vinyl methylpolysiloxane convertible to the cured, solid, elastic state in which the vinyl and methyl groups are attached to silicon by carbon-silicon linkages, there being present from 1.98 to 2.05 total methyl and vinyl groups per silicon atom, (2) a finely divided silica filler, (3) dihexyl azelate, and (4) an organic peroxide curing agent for (1).

19. A composition of matter comprising (1) a vinyl methylpolysiloxane convertible to the cured, solid, elastic state in which the vinyl and methyl groups are attached to silicon by carbon-silicon linkages, there being present from 1.98 to 2.05 total methyl and vinyl groups per silicon atom, (2) a finely divided silica filler, (3) dihexyl phthalate, and (4) an organic peroxide curing agent for (1).

20. A composition of matter comprising (1) a vinyl methylpolysiloxane convertible to the cured, solid, elastic state in which the vinyl and methyl groups are attached to silicon by carbon-silicon linkages, there being present from 1.98 to 2.05 total methyl and vinyl groups per silicon atom, (2) a finely divided silica filler, (3) dibutyl phthalate, and (4) an organic peroxide curing agent for (1).

21. A composition of matter comprising (1) an organopolysiloxane convertible to the cured, solid, elastic state in which the organic groups of the organopolysiloxane comprise methyl groups, phenyl groups, and vinyl groups, all of the said groups being attached to silicon by carbon-silicon linkages, there being present from 1.98 to 2.05 total methyl phenyl and vinyl groups per silicon atom, (2) a finely divided silica filler, and (3) a diester of a dicarboxylic acid selected from the class consisting of aromatic dicarboxylic acids and aliphatic dicarboxylic acids containing from six to twelve carbon atoms in the chain and a monohydric alcohol containing from four to twelve carbon atoms.

22. A composition of matter comprising (1) an organopolysiloxane convertible to the cured, solid, elastic state in which the organic groups are attached to silicon by carbon-silicon linkages, the organic groups being selected from the class consisting of monovalent hydrocarbon radicals and halogenated aryl radicals, there being present from 1.98 to 2.05 organic groups per silicon atom, (2) a finely divided silica filler, (3) a diester of a dicarboxylic acid selected from the class consisting of aromatic dicarboxylic acids and aliphatic dicarboxylic acids containing from six to twelve carbon atoms in the chain and a monohydric alcohol containing from four to twelve carbon atoms, and (4) diphenylsilanediol.

23. A composition of matter comprising (1) a methyl vinylpolysiloxane convertible to the cured, solid, elastic state in which the methyl and vinyl groups are attached to silicon by carbon-silicon linkages, there being present from 1.98 to 2.05 total methyl and vinyl groups per silicon atom, (2) a finely divided silica filler, (3) a diester of a dicarboxylic acid selected from the class consisting of aromatic dicarboxylic acids and aliphatic dicarboxylic acids containing from six to twelve carbon atoms in the chain and a monohydric alcohol containing from four to twelve carbon atoms, (4) an organic peroxide curing agent for (1), and (5) diphenylsilanediol.

References Cited in the file of this patent

UNITED STATES PATENTS

| | | |
|---|---|---|
| 2,508,196 | Seidel et al. | May 16, 1950 |
| 2,717,258 | Kantor | Sept. 6, 1955 |